United States Patent
Matsui (10) Patent No.: US 9,834,659 B2
(45) Date of Patent: Dec. 5, 2017

(54) MAGNESIUM OXIDE PARTICLES, RESIN COMPOSITION, RUBBER COMPOSITION, AND SHAPED BODY

(71) Applicant: Konoshima Chemical Co., Ltd., Osaka (JP)

(72) Inventor: Seiji Matsui, Kagawa (JP)

(73) Assignee: KONOSHIMA CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/779,235

(22) PCT Filed: Aug. 12, 2013

(86) PCT No.: PCT/JP2013/071755
§ 371 (c)(1),
(2) Date: Sep. 22, 2015

(87) PCT Pub. No.: WO2014/155764
PCT Pub. Date: Oct. 2, 2014

(65) Prior Publication Data
US 2016/0053073 A1  Feb. 25, 2016

(30) Foreign Application Priority Data

Mar. 25, 2013 (JP) .................................. 2013-062896

(51) Int. Cl.
| | |
|---|---|
| C01F 5/02 | (2006.01) |
| C09C 1/02 | (2006.01) |
| C08K 3/22 | (2006.01) |
| C01F 5/08 | (2006.01) |
| C01F 5/22 | (2006.01) |
| C08K 9/04 | (2006.01) |
| C01F 5/14 | (2006.01) |
| C01F 5/20 | (2006.01) |

(52) U.S. Cl.
CPC .................. *C08K 3/22* (2013.01); *C01F 5/02* (2013.01); *C01F 5/08* (2013.01); *C01F 5/14* (2013.01); *C01F 5/20* (2013.01); *C01F 5/22* (2013.01); *C08K 9/04* (2013.01); *C09C 1/028* (2013.01); *C01P 2004/03* (2013.01); *C01P 2004/51* (2013.01); *C01P 2004/61* (2013.01); *C01P 2004/62* (2013.01); *C01P 2006/12* (2013.01); *C01P 2006/62* (2013.01); *C08K 2003/222* (2013.01); *C08K 2201/003* (2013.01); *C08K 2201/006* (2013.01)

(58) Field of Classification Search
CPC ...... C08K 2003/222; C09C 1/028; C01F 5/02
See application file for complete search history.

(56) References Cited

U.S. PATENT DOCUMENTS

| | | | |
|---|---|---|---|
| 6,297,307 | B1 | 10/2001 | Eichenauer et al. |
| 2012/0189850 | A1 | 7/2012 | Ohsaki |

FOREIGN PATENT DOCUMENTS

| | | |
|---|---|---|
| EP | 0 370 728 A1 | 5/1990 |
| EP | 1 849 822 A1 | 10/2007 |
| JP | H02-141418 A | 5/1990 |
| JP | H05-286713 A | 11/1993 |
| JP | H10-182927 A | 7/1998 |
| JP | 2005-067196 A | 3/2005 |
| JP | 2012-072004 A | 4/2012 |
| WO | WO-2011/040593 A1 | 4/2011 |

OTHER PUBLICATIONS

Office Action in Chinese Application No. 201380075011.X, dated May 5, 2016.
Office Action in Russian Application No. 2014128560, dated Oct. 29, 2015.
Extended European Search Report for European Application No. 13880420.8, dated Mar. 16, 2016.
English Translation of the International Preliminary Report on Patentability (ISA/JP) for International Application No. PCT/JP2013/071755, dated Oct. 8, 2015, 9 pages.
International Search Report (ISA/JP) for International Application No. PCT/JP2013/071755, dated Nov. 5, 2013, 2 pages.
Office Action in Korean Application No. 10-2015-7019603, dated Dec. 13, 2016.
Office Action in Chinese Patent Application No. 201380075011.X, dated Dec. 28, 2016.
Decision on Rejection in Chinese Patent Application No. 201380075011.X, dated Aug. 2, 2017.

*Primary Examiner* — Vickey Nerangis
(74) *Attorney, Agent, or Firm* — Foley & Lardner LLP; Antoinette F. Konski (57) ABSTRACT

Provided are magnesium oxide particles which are good in dispersibility in a resin or rubber, can function sufficiently as an acid acceptor or scorch retarder, and do not lower, even after combined with a resin or rubber, material properties thereof; a resin composition; a rubber composition; and a shaped body. The magnesium oxide particles satisfying the following (A) to (C): (A) an average particle size is 5 μm or less; (B) a BET specific surface area is 20 m$^2$/g or more and 200 m$^2$/g or less; and (C) a screen residue by a sieve opening of 45 μm is 0.1% by weight or less.

10 Claims, 1 Drawing Sheet

MAGNESIUM OXIDE PARTICLES, RESIN COMPOSITION, RUBBER COMPOSITION, AND SHAPED BODY

CROSS-REFERENCE TO RELATED APPLICATIONS

This application is a national stage application under 35 U.S.C. §371 of International Application No. PCT/JP2013/071755, filed Aug. 12, 2013, which claims priority to Japanese Application No. 2013-062896, filed Mar. 25, 2013, the content of each of which is incorporated herein by reference in its entirety.

TECHNICAL FIELD

The present invention relates to magnesium oxide particles, a resin composition, a rubber composition, and a shaped body.

BACKGROUND ART

Magnesium oxide has properties of being inexpensive and chemically stable, exhibiting basicity, and having non-toxicity. Thus, this substance is used as various applications, examples of which include an adsorbent for adsorbing unpleasant odor generated when an ABS-based resin is shaped or processed (for example, Patent Document 1), an acid acceptor for waste plastics (for example, Patent Document 2), and a scorch retarder for preventing over-crosslinkage of a rubber such as chloroprene rubber (for example, Non-Patent Document 1).

PRIOR ART DOCUMENT

Patent Document

Patent Document 1: JP-A-10-182927
Patent Document 2: JP-A-2005-67196

Non-Patent Document

Non-Patent Document 1: Kanenari Goda et al., "Relationship between Characteristic Values of Domestic Magnesium Oxide and Characteristic Values of Sulfur-Modified CR", the Journal of the Society of Rubber Science and Technology, Japan, vol. 37, No. 7 (1964), pp. 42-48

SUMMARY OF THE INVENTION

Problems to be Solved by the Invention

However, conventional magnesium oxide particles do not function sufficiently as an acid acceptor or a scorch retarder, or is not good in dispersibility in a resin or rubber material so that when the particles are blended with a resin or rubber, the particles cause lowering in material properties of the resin or rubber material.

Thus, an object of the present invention is to provide magnesium oxide particles which are good in dispersibility in a resin or rubber, can function sufficiently as an acid acceptor or scorch retarder, and do not lower, even after combined with a resin or rubber, material properties thereof; a resin composition; a rubber composition; and a shaped body.

Means for Solving the Problems

The present inventor has repeatedly made eager investigations to find out that the above-mentioned problems can be solved by using magnesium oxide particles in a predetermined particle form. The present invention has been achieved on the basis of this finding.

The present invention is magnesium oxide particles satisfying the following (A) to (C):
(A) an average particle size is 5 μm or less;
(B) a BET specific surface area is 20 m$^2$/g or more and 200 m$^2$/g or less; and
(C) a screen residue by a sieve opening of 45 μm is 0.1% by weight or less.

Since the magnesium oxide particles simultaneously satisfy the above-mentioned properties (A) to (C), the particles are good in dispersibility in a resin or rubber (hereinafter referred to also as "resin, etc.") and can further function sufficiently as both an acid acceptor and scorch retarder. Accordingly, even when the magnesium oxide particles are blended with a resin, etc., it is possible to obtain material properties of a desired level. In the present specification, measurements of the average particle size, the BET specific surface area, and the screen residue are according to methods described in Examples.

The magnesium oxide particles are preferably usable as an acid acceptor for resin, or a scorch retarder for rubber.

It is preferred that the magnesium oxide particles are subjected to a surface treatment with at least one surface treatment agent selected from the group consisting of higher fatty acids, higher fatty acid alkaline earth metal salts, coupling agents, esters each made from a fatty acid and a polyhydric alcohol, and phosphates each made from phosphoric acid and a higher alcohol. This makes it possible to further improve the magnesium oxide particles in dispersibility in a resin, etc. (or in a shaped body).

It is preferred that the magnesium oxide particles are obtained through the steps of:
allowing a water-soluble magnesium salt, seawater or salt water to react with an aqueous alkali metal hydroxide solution, an aqueous alkaline earth metal hydroxide solution or an aqueous ammonia solution to prepare a liquid dispersion;
subjecting the liquid dispersion to seed crystal reaction one or more times at a temperature of 1° C. or higher and 100° C. or lower, or a hydrothermal treatment at a temperature higher than 100° C. and 200° C. or lower to yield a raw material for firing; and
firing the raw material for firing at a temperature of 350° C. or higher and 900° C. or lower.

Through these predetermined steps, the magnesium oxide particles satisfying the properties (A) to (C) simultaneously can be efficiently obtained.

Another aspect of the present invention is a resin composition wherein the magnesium oxide particles are blended, in an amount of 0.01 to 5 parts by weight, with 100 parts by weight of at least one resin selected from the group consisting of ABS resins, polypropylene-based resins, polystyrene-based resins, polycarbonate-based resins, polyphenylene-based resins, polyester-based resins and polyamide-based resins.

The magnesium oxide particles are blended as an acid acceptor into the resin composition of the present invention; thus, the strength of a shaped body obtained from the resin composition can be made into a sufficient level. It is possible to effectively prevent discoloration caused by an acid component and the like that are present at the time of resin preparation.

Still another aspect of the present invention is a rubber composition wherein the magnesium oxide particles of the invention are blended, in an amount of 0.01 to 10 parts by weight, with 100 parts by weight of at least one rubber selected from the group consisting of chloroprene rubber, acrylic rubber, nitrile rubber, isoprene rubber, urethane rubber, ethylene propylene rubber, chlorosulfonated polyethylene, epichlorohydrin rubber, silicone rubber, styrene-butadiene rubber, butadiene rubber, fluorine-contained rubber, and polyisobutylene rubber.

The magnesium oxide particles are blended as a scorch retarder into the rubber composition of the present invention; thus, the rubber composition or a shaped body obtained therefrom, for example when stored, can be prevented from undergoing excessive advance of crosslinkage. Furthermore, by the good dispersibility of the magnesium oxide particles, it is possible to prevent deterioration in external appearance by the so-called rashes, in which some of the particles are in a lump form, or the like.

An additional aspect of the present invention is a shaped body obtained from the resin composition of the invention, or a shaped body obtained from the rubber composition of the invention.

MODES FOR CARRYING OUT THE INVENTION

First Embodiment

A first embodiment of the present invention will be described hereinafter. Magnesium oxide particles according to the first embodiment satisfy the following (A) to (C): (A) an average particle size is 5 µm or less; (B) a BET specific surface area is 20 $m^2/g$ or more and 200 $m^2/g$ or less; and (C) a screen residue by a sieve opening of 45 µm is 0.1% by weight or less. When the magnesium oxide particles simultaneously satisfy these properties (A) to (C), the magnesium oxide particles are good in dispersibility in a resin, etc., and are useful as a functional additive for a resin, etc., such as an acid acceptor or scorch retarder.

[Magnesium Oxide Particles]

(A) Average Particle Size

It is sufficient that the upper limit of the average particle size of the magnesium oxide particles is 5 µm. The upper limit is preferably 4 µm, more preferably 3 µm. Contrarily, the lower limit of the average particle size is not particularly limited. The lower limit is preferably 0.1 µm, more preferably 0.2 µm from the viewpoint of the prevention of re-aggregation of the magnesium oxide particles in the resin. When the average particle size is set into the above mentioned range, the resultant shaped body can attain a good external appearance while keeping strength. If the average particle size is more than 5 µm, a shaped body obtained when a resin composition is produced is lowered in Izod impact strength or a shaped body obtained when a rubber composition is produced is deteriorated in external appearance by rashes or the like.

(B) BET Specific Surface Area

The BET specific surface area of the magnesium oxide particles is not particularly limited as far as this surface area is 20 $m^2/g$ or more and 200 $m^2/g$ or less. The BET specific surface area is preferably 30 $m^2/g$ or more and 190 $m^2/g$ or less, more preferably from 40 $m^2/g$ or more and 180 $m^2/g$ or less. When the BET specific surface area is in the above mentioned range, the magnesium oxide particles become good in dispersibility, and can exhibit sufficient scorch-preventing performance. If the BET specific surface area is less than 20 $m^2/g$, a resulting resin composition may be lowered in acid-receiving effect so that a shaped body is discolored, or a resulting rubber composition may be lowered in scorch-preventing performance to degrade storage stability. If the BET specific surface area is more than 200 $m^2/g$, the particles may be lowered in dispersibility in a resin, etc.

(C) Screen Residue by a Sieve Opening of 45 µm

After the magnesium oxide particles are put through a screen having a sieve opening of 45 µm, the screen residue in the whole of the particles is not particularly limited as far as the screen residue is 0.1% by weight or less. The screen residue is preferably 0.05% by weight or less, more preferably 0.01% by weight or less. As the screen residue is lowered, a more preferred result is obtained. The screen residue is preferably 0% by weight. From physical restrictions, the screen residue may be 0.001% by weight or more. When the screen residue is 0.1% by weight or less, lump-forming or coarsening of the particles can be prevented to give a shaped body good in external appearance, and further the shaped body can ensure strength. If the screen residue is more than 0.1% by weight, the magnesium oxide particles form coarse aggregates. Thus, a shaped body obtained when a resin composition is produced may be lowered in Izod strength or a shaped body obtained when a rubber composition is produced may be deteriorated in external appearance by rashes or the like.

(Surface Treatment)

The magnesium oxide particles of the present embodiment are preferably subjected to a surface treatment. An agent for the surface treatment may be a known compound used for a surface treatment purpose. The surface treatment is conducted preferably by use of at least one selected from the group consisting of higher fatty acids, higher fatty acid alkaline earth metal salts, coupling agents, esters made from a fatty acid and a polyhydric alcohol, and phosphates made from phosphoric acid and a higher alcohol. This makes it possible to improve the magnesium oxide particles in dispersibility in a resin, etc., and this improvement makes it possible to maintain or improve properties of the resin composition, the rubber composition and the shaped body which include the particles since the magnesium oxide particles are treated with the predetermined surface treatment agent(s). A surfactant is usable as the surface treatment agent.

(Higher Fatty Acids, and Higher Fatty Acid Alkaline Earth Metal Salts)

Examples of the higher fatty acids include higher fatty acids each having 10 or more carbon atoms, such as stearic acid, erucic acid, palmitic acid, lauric acid, and behenic acid. Stearic acid is preferred from the viewpoint of dispersibility and handleability. Examples of the higher fatty acid alkaline earth metal salts include alkaline earth metal salts of the above-mentioned higher fatty acids. The alkaline earth metal is preferably beryllium, magnesium, calcium, strontium, barium, radium or the like. Of the two species, the higher fatty acid alkaline earth metal salts are preferred from the viewpoint of dispersibility. Of these salts, magnesium stearate is more preferred. These acids or salts may be used alone or in any combination of two or more thereof.

(Coupling Agents)

Examples of the coupling agents include silane-based coupling agents such as γ-glycidoxypropyltrimethoxysilane, β-(3,4-epoxycyclohexyl)ethyltrimethoxysilane, γ-methacryloxypropyltrimethoxysilane, γ-methacryloxypropyltriethoxysilane, γ-acryloxypropylmethyl dimethoxysilane, vinyltriethoxysilane, vinyltriacetoxysilane, p-trimethoxysilylstyrene, p-triethoxysilylstyrene, p-trimethoxysilyl-α-methylstyrene, p-triethoxysilyl-α-methylstyrene, 3-aminopropyltrimethoxysilane, 3-aminopropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N-phenyl-3-aminopropyltrimethoxysilane, N-phenyl-3-aminopropyltriethoxysilane, N-propyl-3-aminopropyltrimethoxysilane, 4-aminobutyltrimethoxysilane, and decyltrimethoxysilane; titanate-based coupling agents such as isopropyltriisostearoyl titanate, isopropyltris(dioctylpyrophosphate)titanate, isopropyltri(N-aminoethyl-aminoethyl)titanate, and isopropyltridecylbenzenesufonyl titanate; and aluminum-based coupling agents such as acetoalkoxyaluminum diisopropylate. These coupling agents may be used alone or in any combination of two or more thereof.

(Esters Made from Fatty Acid and Polyhydric Alcohol)

Examples of the esters made from a fatty acid and a polyhydric alcohol include esters made form a polyhydric alcohol such as glycerin monostearate or glycerin monooleate and a fatty acid; and the like. Examples of the phosphates include a monoester made from orthophosphoric acid and oleyl alcohol, stearyl alcohol or the like, a diester made from the same, or a mixture of the two esters. The monoester, the diester or the mixture may be a phosphate in an acid form, or in the form of an alkali metal salt or the like.

(Phosphates Made from Phosphoric Acid and Higher Alcohol)

Examples of the phosphates made from phosphoric acid and a higher alcohol include a monoester made from orthophosphoric acid and oleyl alcohol, stearyl alcohol or the like, a diester made from the same, or a mixture of the two esters. The monoester, the diester or the mixture may be a phosphate in an acid form, or in the form of an alkaline earth metal salt, or the like.

(Surfactant)

The surfactant is preferably a nonionic surfactant. Examples of the nonionic surfactants include polyoxyethylene alkyl ethers such as polyoxyethylene lauryl ether, polyoxyethylene cetyl ether, polyoxyethylene stearyl ether, polyoxyethylene oleyl ether, and polyoxyethylene higher-alcohol ether; polyoxyethylene alkylaryl ethers such as polyoxyethylene nonylphenyl ether; polyoxyethylene derivatives; sorbitan fatty acid esters such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as polyoxyethylene sorbit tetraoleate; glycerin fatty acid esters such as glycerol monostearate, glycerol monooleate, and self-emulsifying glycerol monostearate; polyoxyethylene fatty acid esters such as polyethylene glycol monolaurate, polyethylene glycol monostearate, polyethylene glycol distearate, and polyethylene glycol monooleate; polyoxyethylene alkylamines; polyoxyethylene hardened castor oil; and alkylalkanolamides.

(Surface Treatment Method)

In order to conduct the surface treatment of the magnesium oxide particles with such a surface treatment agent, a known dry method or wet method is usable. In the dry method, it is sufficient to add a surface treatment agent in a liquid, emulsion or solid form to a powder of magnesium oxide while the powder is stirred in a mixer such as a Henschel mixer, and then mix these components sufficiently with each other while the components are heated or not heated. In the wet method, it is sufficient to add a surface treatment agent in a solution or emulsion form to a nonaqueous-solvent slurry of magnesium oxide yielded by the above-mentioned method for producing magnesium oxide particles, mix these components mechanically with each other at a temperature of, for example, about 1 to 100° C., and then removing the nonaqueous-solvent by drying or the like. Examples of the nonaqueous-solvent include isopropyl alcohol, methyl ethyl ketone and the like. The added amount of the surface treatment agent may be appropriately selected. When the dry method is adopted, the surface treatment state attained is liable to be more uneven than when the wet method is conducted. Thus, it is advisable to increase the added amount of the surface treatment agent to a certain extent as compared with the wet method. Specifically, the amount ranges preferably from 0.5 to 10% by weight, more preferably from 1 to 5% by weight based on 100% by weight of the magnesium oxide particles. When the wet method is adopted, the amount ranges preferably from 0.1 to 5% by weight, more preferably from 0.3 to 3% by weight based on 100% by weight of the magnesium oxide particles from the viewpoint of conducting the surface treatment sufficiently and preventing the aggregation of the surface treatment agent.

The surface-treated magnesium oxide particles are optionally subjected to an approach appropriately selected from granulation, drying, pulverization, classification and the like. In this way, a final product (acid acceptor or scorch retarder) can be prepared.

[Method for Producing Magnesium Oxide Particles]

The magnesium oxide particles of the present embodiment are preferably obtained through the steps of: allowing a water-soluble magnesium salt, seawater or salt water to react with an aqueous alkali metal hydroxide solution, an aqueous alkaline earth metal hydroxide solution or an aqueous ammonia solution to prepare a liquid dispersion; subjecting the liquid dispersion to seed crystal reaction one or more times at a temperature of 1° C. or higher and 100° C. or lower, or a hydrothermal treatment at a temperature higher than 100° C. and 200° C. or lower to yield a raw material for firing; and firing the raw material for firing at a temperature of 350° C. or higher and 900° C. or lower.

(Liquid Dispersion Preparing Step)

Preferred examples of the water-soluble magnesium salt usable in this step include magnesium chloride hexahydrate, magnesium chloride dihydrate, and magnesium chloride anhydrate. Usually, the water-soluble magnesium salt is used in the form of an aqueous solution. As a different magnesium raw material, seawater or salt water may be used. The magnesium ion concentration in each of these aqueous solutions is preferably from 0.01 to 5 mol/L, more preferably from 0.05 to 4 mol/L from the viewpoint of allowing the reaction to advance sufficiently.

The alkali metal hydroxide, which is an alkali raw material, may be, for example, sodium hydroxide or potassium hydroxide. The alkaline earth metal hydroxide may be, for example, magnesium hydroxide or calcium hydroxide. It is sufficient that the alkali concentration in the aqueous alkali solution is from about 0.1 to 18 N. The concentration is preferably from 0.5 to 15 N.

The water-soluble magnesium salt and the aqueous alkali solution, which are prepared in the above-mentioned procedures, respectively, are allowed to react with each other at about 5 to 95° C. for 0.01 to 10 hours to prepare a liquid dispersion containing magnesium hydroxide.

(Preparation Step of Raw Material for Firing)

When a seed crystal reaction (i.e., a technique of allowing a crystal from a seed crystal to grow, thereby yielding particles) is adopted in the present step, the following procedure is performed: a procedure of using the liquid dispersion obtained in the above-mentioned step as a seed, adding thereto an aqueous magnesium chloride solution, which is identical with the above-mentioned magnesium raw material, adding to the resultant an aqueous solution of an alkali such as sodium hydroxide, and then stirring the present system. This process is defined as one cycle of seed crystal reaction. This cycle of seed crystal reaction is repeated at 1 to 50 cycles. In this way, a magnesium hydroxide slurry can be prepared. At the time of the seed crystal reaction, the magnesium ion concentration is preferably from 0.05 to 4 mol/L from the viewpoint of allowing the reaction to advance sufficiently. The alkali concentration in the aqueous alkali solution is preferably from about 0.5 to 15 N. After the aqueous magnesium chloride solution is mixed with the aqueous alkali solution, the stirring temperature is preferably from 1 to 100° C., more preferably from 5 to 95° C., even more preferably from 10 to 90° C. The period for the stirring is preferably from 0.01 to 10 hours, more preferably from 0.1 to 8 hours.

When a hydrothermal treatment is adopted instead of the seed crystal reaction in this step, the liquid dispersion is charged into a known pressure-resistant heating vessel such as an autoclave and then the liquid dispersion is subjected to a hydrothermal treatment under stirring at a temperature higher than 100° C. and 200° C. or lower, preferably a temperature in a range of 110 or higher and 190° C. or lower, and preferably for 0.01 to 10 hours, more preferably for about 0.1 to 8 hours. In this way, a magnesium hydroxide slurry can be prepared.

The magnesium hydroxide slurry obtained through the seed crystal reaction or hydrothermal treatment is filtrated, washed with water and dried, and optionally pulverized. In this way, magnesium hydroxide particles can be obtained, which are a raw material for firing.

(Firing Step)

The magnesium hydroxide particles for firing are fired in a heating furnace having a temperature from 350 to 900° C. for 0.1 to 8 hours, and then optionally pulverized. In this way, magnesium oxide particles of the present embodiment can be obtained.

The resultant magnesium oxide particles may be optionally subjected to a surface treatment by the above-mentioned surface treatment procedures.

Second Embodiment

[Resin Composition]

A second embodiment is a resin composition in which the magnesium oxide particles of the first embodiment are blended with a predetermined resin. In the present embodiment, the magnesium oxide particles can appropriately function as an acid acceptor for neutralizing a catalyst component or an acid component which is present, when the resin is prepared, in a system therefor.

The resin contained in the resin composition of the present embodiment is preferably at least one selected from the group consisting of ABS-based resins, polypropylene-based resins, polystyrene-based resins, polycarbonate-based resins, polyphenylene-based resins, polyester-based resins, and polyamide-based resins. These may be selected according to their applications.

In the resin composition, the magnesium oxide particles are blended in an amount of 0.01 to 5 parts by weight, preferably 0.05 to 3 parts by weight, more preferably 0.1 to 1 part by weight based on 100 parts by weight of the resin. When the blended amount of the magnesium oxide particles is set into the above mentioned range, the magnesium oxide particles can sufficiently exhibit a function as an acid acceptor. Furthermore, the magnesium oxide particles can be prevented from being aggregated in the resin composition or a shaped body therefrom so that desired material properties and external appearance can be exhibited.

(Other Additives)

Additives other than the above-mentioned components may be blended into the above-mentioned resin composition as far as the advantageous effects of the invention are not impaired. Examples of the additives include an antioxidant, an antistatic agent, a pigment, a foaming agent, a plasticizer, a filler, a reinforcing agent, a flame retardant, a crosslinking agent, a light stabilizer, an ultraviolet absorbent, a lubricant, and the like.

[Shaped Body]

The shaped body of the present embodiment is obtained by use of the resin composition. The shaped body can be obtained by blending a predetermined amount of the magnesium oxide particles with the resin, and then shaping the resultant composition by a known shaping method. Examples of the shaping method include extrusion forming, injection molding, calendaring, and the like.

Since the predetermined magnesium oxide particles are blended into the shaped body of the present embodiment, the shaped body is excellent in impact strength and external appearance. The shaped body is usable for various applications for which impact resistance and the like are required. Examples of the applications include OA instruments, automobile parts (interior and exterior parts), game machines, building members (for interiors), electrical appliances (such as outside parts of air conditioners and refrigerators, and the so-called housings of entire electronic and electrical instruments), miscellaneous goods, stationery, furniture, musical instruments (such as a recorder), mechanical parts, and the like.

Third Embodiment

[Rubber Composition]

A third embodiment of the present invention is a resin composition in which the magnesium oxide particles of the first embodiment are blended with predetermined rubber. In the present embodiment, the magnesium oxide particles can appropriately function as a scorch retarder for preventing the advance of crosslinkage of a rubber composition when the composition is stored, so as to shape and vulcanize the composition easily in a subsequent step.

The rubber contained in the resin composition of the present embodiment is preferably at least one selected from the group consisting of chloroprene rubber, acrylic rubber, nitrile rubber, isoprene rubber, urethane rubber, ethylene propylene rubber, chlorosulfonated polyethylene, epichlorohydrin rubber, silicone rubber, styrene-butadiene rubber, butadiene rubber, fluorine-contained rubber, and polyisobutylene rubber. They may be selected in accordance with the use purpose.

In the rubber composition, the magnesium oxide particles are blended in an amount of 0.01 to 10 parts by weight, preferably 0.1 to 8 parts by weight, more preferably 1 to 6 parts by weight based on 100 parts by weight of the rubber. When the blended amount of the magnesium oxide particles is set into the above mentioned range, the magnesium oxide particles can sufficiently exhibit a function as a scorch retarder. Furthermore, the magnesium oxide particles can be prevented from being aggregated in the rubber composition or a shaped body therefrom so that desired material properties and external appearance can be exhibited.

[Shaped Body]

The shaped body of the third embodiment is obtained from the above-mentioned rubber composition. The method for shaping the composition into the shaped body, applications for which the shaped body is used, and the like may be the same as described in the second embodiment.

EXAMPLES

Hereinafter, the present invention will be described in detail by way of Examples; however, the invention is not limited to Examples described below as far as the invention is not beyond the gist thereof.

Example 1

High-purity $MgCl_2.6H_2O$ as a magnesium raw material was weighed to a weight of 480 g in a polyethylene vessel 3 L in volume. Thereto was added 1 L of pure water, and this system was stirred to prepare an aqueous solution of $MgCl_2$. While the solution was stirred, thereto was slowly added 510 mL of an alkali raw material, i.e., an aqueous 8.3 N solution of NaOH (ratio by mole number of $Mg^{2+}/OH^-=1/1.8$). Thereto was further added pure water to prepare 2 L of a suspension. This suspension was allowed to flow into an autoclave, 3 L in volume, having a liquid-contacting region made of hastelloy C-276. While stirred, the suspension was subjected to a hydrothermal treatment at 140° C. for 5 hours. After the hydrothermal treatment, the slurry was vacuum-filtrated, washed sufficiently with pure water the volume of which was at least 20 times larger than the volume of the resultant solid, dried, and then pulverized in a bantam mill to yield a raw material a-1 of a $Mg(OH)_2$ powder for firing.

Into an alumina crucible of 300 mL volume was filled 100 g of the raw material a-1. An electrical furnace was used to fire the raw material at 450° C. for 2 hours, and then the resultant was pulverized in a bantam mill to yield a sample A-1 of a MgO powder.

Example 2

High-purity $MgCl_2.6H_2O$ as a magnesium raw material was weighed to a weight of 480 g in a polyethylene vessel 3 L in volume. Thereto was added 1 L of pure water, and this system was stirred to prepare an aqueous solution of $MgCl_2$. While the solution was stirred, thereto was slowly added 630 mL of an alkali material, i.e., a $Ca(OH)_2$ slurry having a concentration of 25 g/dL (ratio by mole number of $Mg^{2+}/OH^-=1/1.8$). Thereto was further added pure water to prepare 2 L of a suspension. This suspension was allowed to flow into an autoclave, 3 L in volume, having a liquid-contacting region made of hastelloy C-276. While stirred, the suspension was subjected to a hydrothermal treatment at 115° C. for 5 hours. By the same operations as used to prepare the raw material a-1 and the sample A-1 in Example 1 except that a series of operations described above were conducted, a raw material a-2 and a sample A-2 were yielded.

Example 3

High-purity $MgCl_2.6H_2O$ as a magnesium raw material was weighed to a weight of 480 g in a polyethylene vessel 15 L in volume. Thereto was added 1 L of pure water, and this system was stirred to prepare an aqueous solution of $MgCl_2$. While the solution was stirred, thereto was slowly added 510 mL of an alkali raw material, i.e., an aqueous 8.3 N solution of NaOH (ratio by mole number of $Mg^{2+}/OH^-=1/1.8$) to prepare a $Mg(OH)_2$ suspension. This $Mg(OH)_2$ suspension was used as a seed, and from above the suspension was added an aqueous $MgCl_2$ solution in which 480 g of high-purity $MgCl_2.6H_2O$ was dissolved in 1 L of pure water. Furthermore, thereto was slowly added 510 mL of an aqueous 8.3 N solution of NaOH under stirring. Thereafter, with stirring for 5 minutes, a first seed crystal reaction was conducted. Such a seed crystal reaction was repeated 8 times in total. By the same operations as used to prepare the raw material a-1 and the sample A-1 in Example 1 except that a series of operations described above were conducted, a raw material a-3 and a sample A-3 were yielded.

Example 4

By the same operations as used to prepare the raw material a-3 and the sample A-3 in Example 3 except that the seed crystal reaction was repeated 7 times in total and the firing temperature was set to 700° C., a raw material a-4 and a sample A-4 were yielded.

Example 5

By the same operations as used to prepare the raw material a-3 in Example 3 except that the seed crystal reaction was repeated 5 times in total, a raw material a-5 was yielded. Thereafter, into an alumina crucible of 300 mL volume was filled 100 g of the raw material a-5. An electrical furnace was used to fire the raw material at 450° C. for 2 hours to produce a MgO powder. From the MgO powder, a weight of 60 g was collected, and thereto was added 1.2 g of a stearic acid (St acid) powder. These components were sufficiently mixed with each other in a polyethylene bag for 5 minutes. The resultant was then pulverized in a bantam mill to yield a MgO powder subjected to the dry surface treatment with 2% by mass stearic acid (sample A-5).

Comparative Example 1

High-purity $MgCl_2.6H_2O$ as a magnesium raw material was weighed to a weight of 480 g in a polyethylene vessel 3 L in volume. Thereto was added 1 L of pure water, and this system was stirred to prepare an aqueous solution of $MgCl_2$. While the solution was stirred, thereto was slowly added 510 mL of an alkali raw material, i.e., an aqueous 8.3 N solution of NaOH (ratio by mole number of $Mg^{2+}/OH^-=1/1.8$) to only produce $Mg(OH)_2$, and no seed crystal reaction was conducted (single-operation reaction). By the same operations as used to prepare the raw material a-1 and the sample A-1 in Example 1 except that a series of operations described above were conducted, a raw material b-1 and a sample B-1 were yielded.

Comparative Example 2

By the same operations as used to prepare the raw material a-3 and the sample A-3 in Example 3 except that the seed crystal reaction was repeated 6 times in total and the firing temperature was set to 950° C., a raw material b-2 and a sample B-2 were yielded.

Comparative Example 3

Into an alumina crucible of 300 mL volume was filled 100 g of a natural magnesite powder as a raw material b-3 for firing. An electrical furnace was used to fire the powder at 450° C. for 2 hours, and the resultant was then pulverized in a bantam mill to yield a sample B-3 of a MgO powder.

Comparative Example 4

High-purity $MgCl_2.6H_2O$ as a magnesium raw material was weighed to a weight of 480 g in a polyethylene vessel 3 L in volume. Thereto was added 1 L of pure water, and this system was stirred to prepare an aqueous solution of $MgCl_2$. While the solution was stirred, thereto was slowly added 510 mL of an alkali raw material, i.e., an aqueous 8.3 N solution of NaOH (ratio by mole number of $Mg^{2+}/OH^-=1/1.8$). Thereto was further added pure water to prepare 2 L of a suspension. This suspension was allowed to flow into a vessel, 3 L in volume, made of SUS 316. While stirred, the suspension was cured under normal pressure at 90° C. for 8 hours. By the same operations as used to prepare the raw material a-1 and the sample A-1 in Example 1 except that a series of operations described above were conducted, a raw material b-4 and a sample B-4 were yielded.

[Analysis of Samples]

With respect to each of the samples obtained in Examples and Comparative Examples, analyses described below were made. The results of each of the analyses are shown in Table 1.

(1) Average Particle Size Measurement

Into a beaker 100 mL in volume was put 50 ml of ethanol, and thereto was added about 0.2 g of the powder of the sample. The system was subjected to ultrasonic treatment for 3 minutes to prepare a liquid dispersion. A laser-diffraction/particle-size-distribution meter (Microtrac HRA, Model 9320-X100, manufactured by NIKKISO CO., LTD.) was used to measure this prepared liquid dispersion to obtain the $D_{50}$ value thereof by volume as an average particle size [μm].

(2) BET Specific Surface Area Measurement

A BET-specific surface area meter (β sorb, Model 4200, manufactured by NIKKISO CO., LTD.) was used to measure the BET specific surface area of the sample powder.

(3) Measurement of Screen Residue by a Sieve Opening of 45 μm

Into a beaker, 500 mL in volume, made of polyethylene was put 200 ml of ethanol, and thereto was added 20 g of the powder of the sample. The sample liquid was stirred with a stirring rod, and further thereto was added 200 mL of water. The liquid was sufficiently stirred to prepare a slurry. This was shifted onto a screen having a sieve opening of 45 μm. Next, while water was allowed to shower strongly onto the screen, the screen was lightly brushed with a brush made of silicone resin. At the time when the sample came not to pass through the screen, the screen was washed with a small volume of water. Together with the screen, the remaining matter was then dried at 110° C. for 30 minutes. After cooling, residues on the screen were collected and weighed with an electronic balance. The 45 μm screen residue by was calculated out in accordance with the following equation:

45 μm screen residue (%)=("weight (g) of residues remaining on 45 μm screen"/"weight (g) of sample powder")×100

Examples 6 to 10, and Comparative Examples 5 to 7

An ABS resin was blended with each of the samples A-1 to A-5 of Examples 1 to 5, and the samples B-1 to B-3 of Comparative Examples 1 to 3 to prepare a resin composition. This was shaped. The resultant shaped body was evaluated as described below. The results of the evaluation are shown in Table 1 together with a procedure of the preparation of particles thereof.

(Production of Resin Compositions and Shaped Bodies)

In a Laboplast mill (manufactured by Toyo Seiki Kogyo Co., Ltd.), 100 parts by mass of the ABS resin (EX-120, manufactured by UMG ABS, Ltd.) and 0.5 parts by mass of each of the MgO sample powders were melted and kneaded at 200° C. for 5 minutes. The kneaded body was cut to have a diameter of 5 mm or less with a shredder, so as to produce a resin composition in a pellet form. An injection molding machine (J-50E2, manufactured by The Japan Steel Works, LTD.) was used to injection-mold this resin composition at an outlet temperature of 220° C. to yield each ABS test piece of 12 mm width, 3 mm thickness and 65 mm length.

(Measurement of Notched Izod Impact Strength)

In accordance with JIS K 7110, any one of the respective ABS test pieces was measured. A target value of the Izod impact strength was decided to be 6.0 $kJ/m^2$ or more.

(Heat Resistance Test)

Any one of the respective ABS test pieces was put into a gear oven of 100° C. temperature. After 30 days therefrom, the color of the test piece was visually checked. When the test piece was not or hardly changed in color, the test piece was judged to be good. When the test piece was changed in color, the test piece was judged to be bad.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Raw materials | Magnesium raw material | Species | Raw material a-1 High-purity MgCl$_2$—6H$_2$O salt | Raw material a-2 High-purity MgCl$_2$—6H$_2$O salt | Raw material a-3 High-purity MgCl$_2$—6H$_2$O salt | Raw material a-4 High-purity MgCl$_2$—6H$_2$O salt | Raw material a-5 High-purity MgCl$_2$—6H$_2$O salt | Raw material b-1 High-purity MgCl$_2$—6H$_2$O salt | Raw material b-2 High-purity MgCl$_2$—6H$_2$O salt | Raw material b-3 Natural magnesite |
| | | Used amount | 480 g | 480 g | 480 g | 480 g | 480 g | 480 g | 480 g | — |
| | Alkali raw material | Species | 8.3-N NaOH solution | 25 g/dL-Ca(OH)$_2$ slurry | 8.3-N NaOH solution | 8.3-N NaOH solution | 8.3-N NaOH solution | 8.3-N NaOH solution | 8.3-N NaOH solution | — |
| | | Used amount | 510 mL | 630 mL | 510 mL | 510 mL | 510 mL | 510 mL | 510 mL | — |
| | Preparing method | (-) | Hydrothermal treatment | Hydrothermal treatment | Seed crystal operation (times: 8) | Seed crystal operation (times: 7) | Seed crystal operation (times: 5) | Single-operation reaction | Seed crystal operation (times: 6) | — |
| | Reaction temperature | (° C.) | 140 | 115 | 25 | 25 | 25 | 25 | 25 | — |
| Samples | | | Sample A-1 | Sample A-2 | Sample A-3 | Sample A-4 | Sample A-5 | Sample B-1 | Sample B-2 | Sample B-3 |
| Magnesium oxide properties | Firing Temperature | (° C.) | 450 | 450 | 450 | 700 | 450 | 450 | 950 | 600 |
| | Average particle size | (μm) | 1.2 | 0.5 | 3.8 | 3.7 | 3.0 | 6.9 | 3.6 | 13.1 |
| | BET specific surface area | (m$^2$/g) | 165 | 153 | 147 | 40 | 143 | 157 | 8 | 50 |
| | 45 μm screen residue | (%) | 0.01 | 0.03 | 0.02 | 0.05 | 0.01 | 3.9 | 0.04 | 0.3 |
| | Surface treatment | (-) | Not conducted | Not conducted | Not conducted | Not conducted | 2% St acid | Not conducted | Not conducted | Not conducted |

| | | | Example 6 | Example 7 | Example 8 | Example 9 | Example 10 | Comparative Example 5 | Comparative Example 6 | Comparative Example 7 |
|---|---|---|---|---|---|---|---|---|---|---|
| ABS resin composition properties | Izod impact strength | (kJ/m$^2$) | 8.5 | 9.4 | 6.4 | 8.1 | 7.3 | 5.1 | 9.2 | 3.5 |
| | Color after 30 days at 100° C. | (° C.) | Good | Good | Good | Good | Good | Good | Bad | Good |

According to Table 1, the shaped bodies of Examples 6 to 10 were sufficient in Izod impact strength, and were not changed in color after heated. The shaped bodies of Comparative Examples 5 and 7 were not changed in color after heated, but were lowered in Izod impact strength. It is considered that this was caused by the fact that the magnesium oxide particles were too large in average particle size to be poor in dispersibility in the ABS. The shaped body of Comparative Example 6 was good in Izod impact strength, but was changed in color after heated. It is considered that this was caused by the fact that the magnesium oxide particles were too small in BET specific surface area to be lowered in activity so that the acid-receiving affect thereof was declined.

Examples 11 to 15, and Comparative Examples 8 to 11

Chloroprene rubber was blended with each of the samples A-1 to A-5 of Examples 1 to 5, and the samples B-1 to B-4 of Comparative Examples 1 to 4 to prepare a rubber composition. This was shaped. The resultant shaped body was evaluated as described below. The results of the evaluation are shown in Table 2 together with a procedure of the preparation of particles thereof.

(Preparation of Chloroprene Rubber Compositions)

100 parts by mass of neoprene GNR as a rubber component, 0.5 parts by mass of stearic acid, 2 parts by mass of phenyl-α-naphthylamine, 5 parts by mass of zinc flower, and 4 parts by mass of each of the MgO sample powders were kneaded by rolls at normal temperature for 5 minutes to yield a chloroprene rubber composition.

(Measurement of Scorch Period)

A Mooney viscometer was used to measure the scorch period of the chloroprene rubber composition at ML 125° C. A target value of the scorch period was decided to be 20 minutes or longer.

(External Appearance Evaluation)

The chloroprene rubber composition was vulcanized at 153° C. for 15 minutes. The external appearance of the resultant sheet was visually judged. When portions in each of which the magnesium oxide particles aggregated or gathered into a lump were not or hardly observed, the composition was judged to be good. When some lumps were observed, the composition was judged to be acceptable. When many lumps were observed, the composition was judged to be bad.

(Dispersibility Evaluation)

Figure 1:
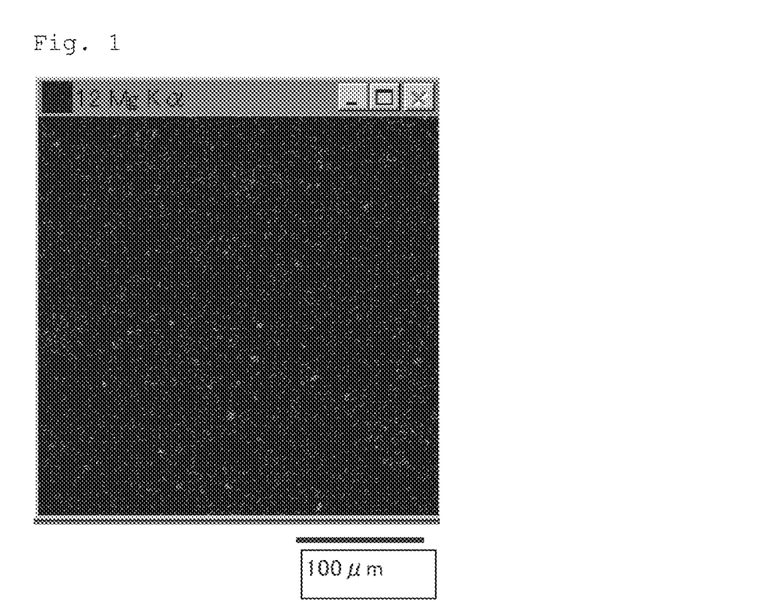
FIG. 1 is a chart showing a mapping result according to an EDX analysis of a rubber composition in Example 11 of the present invention.
Figure 2:
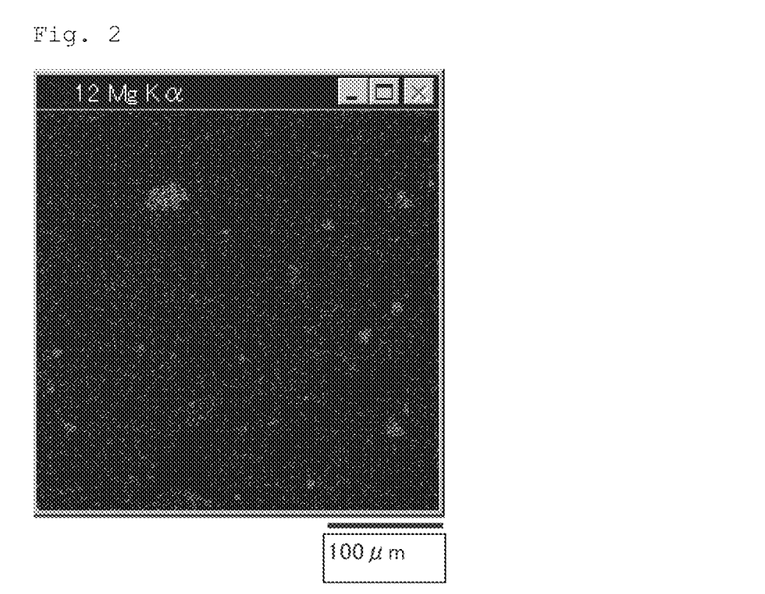
FIG. 2 is a chart showing a mapping result according to an EDX analysis of a rubber composition in Comparative Example 8.

The chloroprene rubber composition of each of Example 11 and Comparative Example 8 was frozen and broken with liquid nitrogen, and then a cross section thereof was subjected to EDX analysis (energy dispersive X-ray analysis; machine: EMAX-7000, manufactured by Horiba, Ltd.; and measuring conditions: an accelerating voltage of 15 kV and a probe current of 0.5 nA). Specifically, the cross section of the rubber composition was subjected to Mg mapping, and the dispersibility of the MgO particles was evaluated. FIG. 1 shows the Mg mapping result of Example 11; and FIG. 2 shows the Mg mapping result of Comparative Example 8.

TABLE 2

| | | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
| Raw materials | Magnesium raw material | Species | Raw material a-1 High-purity MgCl₂—6H₂O salt | Raw material a-2 High-purity MgCl₂—6H₂O salt | Raw material a-3 High-purity MgCl₂—6H₂O salt | Raw material a-4 High-purity MgCl₂—6H₂O salt | Raw material a-5 High-purity MgCl₂—6H₂O salt | Raw material b-1 High-purity MgCl₂—6H₂O salt | Raw material b-2 High-purity MgCl₂—6H₂O salt | Raw material b-3 Natural magnesite | Raw material b-4 High-purity MgCl₂—6H₂O salt |
| | | Used amount | 480 g | 480 g | 480 g | 480 g | 480 g | 480 g | 480 g | — | 480 g |
| | Alkali raw material | Species | 8.3-N NaOH solution | 25 g/dL-Ca(OH)₂ slurry | 8.3-N NaOH solution | 8.3-N NaOH solution | 8.3-N NaOH solution | 8.3-N NaOH solution | 8.3-N NaOH solution | — | 8.3-N NaOH solution |
| | | Used amount | 510 mL | 630 mL | 510 mL | 510 mL | 510 mL | 510 mL | 510 mL | — | 630 mL |
| | Preparing method | (-) | Hydrothermal treatment | Hydrothermal treatment | Seed crystal operation (times: 8) | Seed crystal operation (times: 7) | Seed crystal operation (times: 5) | Single-operation reaction | Seed crystal operation (times: 6) | — | Curling at normal pressure |
| Samples | Reaction temperature | (°C.) | 140 | 115 | 25 | 25 | 25 | 25 | 25 | — | 90 |
| | Firing Temperature | (°C.) | Sample A-1 450 | Sample A-2 450 | Sample A-3 450 | Sample A-4 700 | Sample A-5 450 | Sample B-1 450 | Sample B-2 950 | Sample B-3 600 | Sample B-4 450 |
| | Magnesium oxide properties | Average particle size (μm) | 1.2 | 0.5 | 3.8 | 3.7 | 3.0 | 6.9 | 3.6 | 13.1 | 0.7 |
| | | BET specific surface area (m²/g) | 165 | 153 | 147 | 40 | 143 | 157 | 8 | 50 | 162 |
| | | 45 μm screen residue (%) | 0.01 | 0.03 | 0.02 | 0.05 | 0.01 | 3.9 | 0.04 | 0.3 | 0.2 |
| | | Surface treatment | Not conducted | Not conducted | Not conducted | Not conducted | 2% St acid | Not conducted | Not conducted | Not conducted | Not conducted |

| | | | Example 11 | Example 12 | Example 13 | Example 14 | Example 15 | Comparative Example 8 | Comparative Example 9 | Comparative Example 10 | Comparative Example 11 |
|---|---|---|---|---|---|---|---|---|---|---|---|
| Rubber composition properties | Scorch period | (minutes) | 39 | 35 | 36 | 23 | 28 | 33 | 11 | 22 | 34 |
| | Composition external appearance (dispersibility) | (-) | Good | Good | Good | Good | Good | Bad | Good | Acceptable | Acceptable |

According to Table 2, the rubber compositions of Examples 11 to 15 succeeded in ensuring a sufficient scorch period, and were also good in external appearance. On the other hand, Comparative Examples 8, 10 and 11 were sufficient in scorch period, but lumps of the magnesium oxide particles emerged in their external appearance. It is considered that this was caused by the fact that the value of the 45 μm screen residue was more than 0.1% by weight so that coarse particles were present. Comparative Example 9 was good in external appearance, but was short in scorch period. It is considered that this was caused by the fact that the firing temperature of the raw material was higher than 900° C. and thus crystals of magnesium oxide grew excessively, so that the magnesium oxide particles became small in BET specific surface area to be decreased in scorch-preventing effect.

It is understood that, from the Mg mapping result by the EDX analysis, lumps of the magnesium oxide particles were hardly present in Example 11, and the particles were satisfactorily dispersed. However, it is understood that in Comparative Example 8, lumps of the magnesium oxide particles were interspersed.

The invention claimed is:

1. Magnesium oxide particles satisfying the following (A) to (C):
    (A) an average particle size is 5 μm or less;
    (B) a BET specific surface area is 20 $m^2/g$ or more and 200 $m^2/g$ or less; and
    (C) a screen residue by a sieve opening of 45 μm after a slurry prepared by stirring 20 grams of the magnesium oxide particles with 200 ml of ethanol and then adding 200 ml of water is shifted onto the screen is 0.1% by weight or less.

2. The magnesium oxide particles according to claim 1, which are an acid acceptor for resin.

3. The magnesium oxide particles according to claim 1, which are a scorch retarder for rubber.

4. The magnesium oxide particles according to claim 1, which are subjected to a surface treatment with at least one surface treatment agent selected from the group consisting of higher fatty acids, higher fatty acid alkaline earth salts, coupling agents, esters made from a fatty acid and a polyhydric alcohol, and phosphates made from phosphoric acid and a higher alcohol.

5. The magnesium oxide particles according to any one of claims 1 to 3, which are obtained through the steps of:
    allowing a water-soluble magnesium salt, seawater or salt water to react with an aqueous alkali metal hydroxide solution, an aqueous alkaline earth metal hydroxide solution or an aqueous ammonia solution to prepare a liquid dispersion;
    subjecting the liquid dispersion to seed crystal reaction one or more times at a temperature of 1° C. or higher and 100° C. or lower, or a hydrothermal treatment at a temperature higher than 100° C. and 200° C. or lower to yield a raw material for firing; and
    firing the raw material for firing at a temperature of 350° C. or higher and 900° C. or lower.

6. The magnesium oxide particles according to claim 1, wherein the particles have a BET specific surface area of 143 $m^2/g$-200 $m^2/g$.

7. A resin composition, wherein the magnesium oxide particles according to claim 2 or 4 are blended, in an amount of 0.01 to 5 parts by weight, with 100 parts by weight of at least one resin selected from the group consisting of ABS resins, polypropylene resins, polystyrene resins, polycarbonate resins, polyphenylene resins, polyester resins and polyamide resins.

8. A shaped body, obtained from the resin composition according to claim 7.

9. A rubber composition, wherein the magnesium oxide particles according to claim 3 or 4 are blended, in an amount of 0.01 to 10 parts by weight, with 100 parts by weight of at least one rubber selected from the group consisting of chloroprene rubber, acrylic rubber, nitrile rubber, isoprene rubber, urethane rubber, ethylene propylene rubber, chlorosulfonated polyethylene, epichlorohydrin rubber, silicone rubber, styrene-butadiene rubber, butadiene rubber, fluorine-contained rubber, and polyisobutylene rubber.

10. A shaped body, obtained from the rubber composition according to claim 9.

* * * * *